(12) United States Patent
Wood

(10) Patent No.: US 6,600,759 B1
(45) Date of Patent: Jul. 29, 2003

(54) APPARATUS FOR ESTIMATING JITTER IN RTP ENCAPSULATED VOICE PACKETS RECEIVED OVER A DATA NETWORK

(75) Inventor: Robert Geoffrey Wood, Ottawa (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/466,098

(22) Filed: Dec. 17, 1999

(30) Foreign Application Priority Data

Dec. 18, 1998 (GB) .............................................. 9828038

(51) Int. Cl.$^7$ .................................................. H04J 3/06
(52) U.S. Cl. .................. 370/516; 370/252; 370/395.52; 370/512; 375/226
(58) Field of Search ................................ 370/241, 252, 370/395.52, 389, 468, 512, 513, 516, 517, 518, 519; 375/224, 226, 227, 228

(56) References Cited

U.S. PATENT DOCUMENTS

| 4,569,042 A | 2/1986 | Larson | 370/13 |
|---|---|---|---|
| 4,894,823 A | 1/1990 | Adelmann et al. | 370/60 |
| 5,260,978 A | 11/1993 | Fleischer et al. | 375/106 |
| 5,640,388 A | 6/1997 | Woodhead et al. | 370/468 |
| 5,790,543 A | 8/1998 | Cloutier | 370/395 |

OTHER PUBLICATIONS

IETF RFC 1889, "RTP: A Transport Protocol for Real Time Applications", Jan. 1996, Schulzrinne et al.
Tomi Yletyinen, et al., "Voice Packet Interarrival Jitter Over IP Switching", Helsinki University of Technology, ITS'98 Proceedings, SBT/IEEE International Telecommunications Symposium (Cat. No. 98EX202), part vol. 1, p. 16–21.

*Primary Examiner*—Dang Ton
*Assistant Examiner*—Shick Hom
(74) *Attorney, Agent, or Firm*—Keating & Bennett, LLP

(57) ABSTRACT

A system is provided for estimating interarrival jitter in real time, using hardware elements. The apparatus is capable of processing orders of magnitude more packetized voice streams than prior art software implementations. According to a preferred embodiment of the invention, a plurality of registers and arithmetic units are used to process packet spacing values to generate an estimate of the packet interarrival jitter. The hardware elements are controlled by a state machine whose operation is initiated by the reception of a packet of voice data.

2 Claims, 2 Drawing Sheets

APPARATUS FOR ESTIMATING JITTER IN RTP ENCAPSULATED VOICE PACKETS RECEIVED OVER A DATA NETWORK

FIELD OF THE INVENTION

This invention relates in general to communication systems and more specifically to an apparatus and method for estimating jitter invoice packets received over a network running the Internet Protocol (IP).

BACKGROUND OF THE INVENTION

The Internet Engineering Task Force (IETF) has developed a standard for transmission of voice traffic over packet data networks running the Internet Protocol. This Real Time Protocol (RTP) is defined in RFC 1889. The Real Time Protocol requires an estimate of the jitter in the arrival time of each received voice packet (referred to herein as the interarrival jitter). A value for the interarrival jitter is required for each voice stream, and the calculation is required to be performed every time that a voice packet is received.

Traditionally, the value for interarrival jitter has been calculated using software algorithms. However, this calculation represents significant processing overhead when many separate voice streams are being received simultaneously.

SUMMARY OF THE INVENTION

According to the present invention, a system is provided for estimating interarrival jitter in real time, using hardware elements. The apparatus of the present invention is capable of processing orders of magnitude more packetized voice streams than prior art software implementations. According to a preferred embodiment of the invention, a plurality of registers and arithmetic units are used to process packet spacing values to generate an estimate of the packet interarrival jitter. The hardware elements are controlled by a state machine whose operation is initiated by the reception of a packet of voice data.

BRIEF DESCRIPTION OF THE DRAWINGS

A preferred embodiment of the present invention is described herein below with reference to the following drawings in which.

DETAILED DESCRIPTION OF THE PREFERRED EMBODIMENT

The Real Time Protocol defined in section 6.3.1 of RFC 1889 sets the formula for interarrival jitter as:

$$J=J+(|Di-1, i|-J)/16,$$

where D is the difference in packet spacing at a receiver compared to the sender, for a pair of packets.

Figure 1:
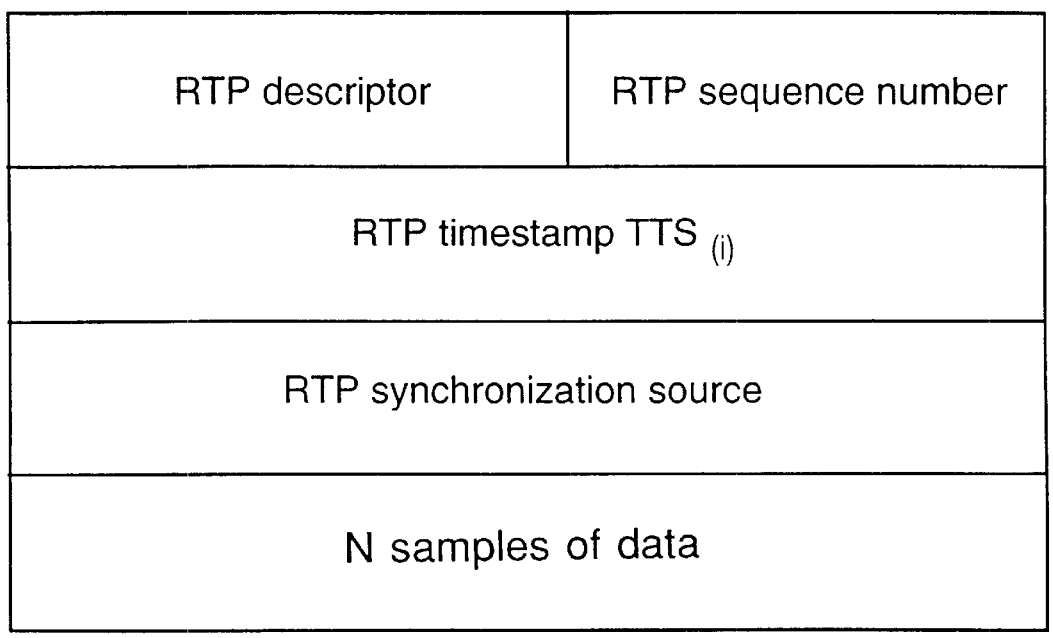
FIG. 1 shows the structure of a voice packet as sent by a transmitter in accordance with RTP.

The standard requires that both the sender (i.e. transmitter) of the packet and the receiver are provided with a 32-bit time stamp counter. Each counter is driven by a clock having nominally the same frequency (e.g. a clock having frequency equivalent to the sample rate for the voice data). When the packet is formed at the transmitter, the counter value is inserted into an RTP field of the packet, as shown in FIG. 1. This is referred to as the transmitter's "time stamp" ($TTS_{(i)}$). When a packet is received, the local counter for the receiver provides a receiver's "time stamp" ($RTS_{(i)}$). The suffix (i) designates a current time stamp, whereas (i−1) designates a preceding packet time stamp.

The Real Time Protocol specifies:

$$D=(RTS_{(i)}-TTS_{(i)})-(RTS_{(i-1)}-TTS_{(i-1)})$$

The expression for the jitter J can be reduced to an integer implementation, as follows:

$$J=J+|D|-((J+8)>>4),$$

where >>4 represents shifting the value by 4 bit positions to the right (i.e. divide by 16). Note that |D| represents the magnitude of D. Thus, as it is a 2's complement number, if negative, it must be converted to a positiveve integer by a well known 2's complement algorithm. This is shown as block 27 in FIG. 2. Any overflow generated by subtractor 22 will cause the value of D to be inverted and a value of one added to it.

Figure 2:
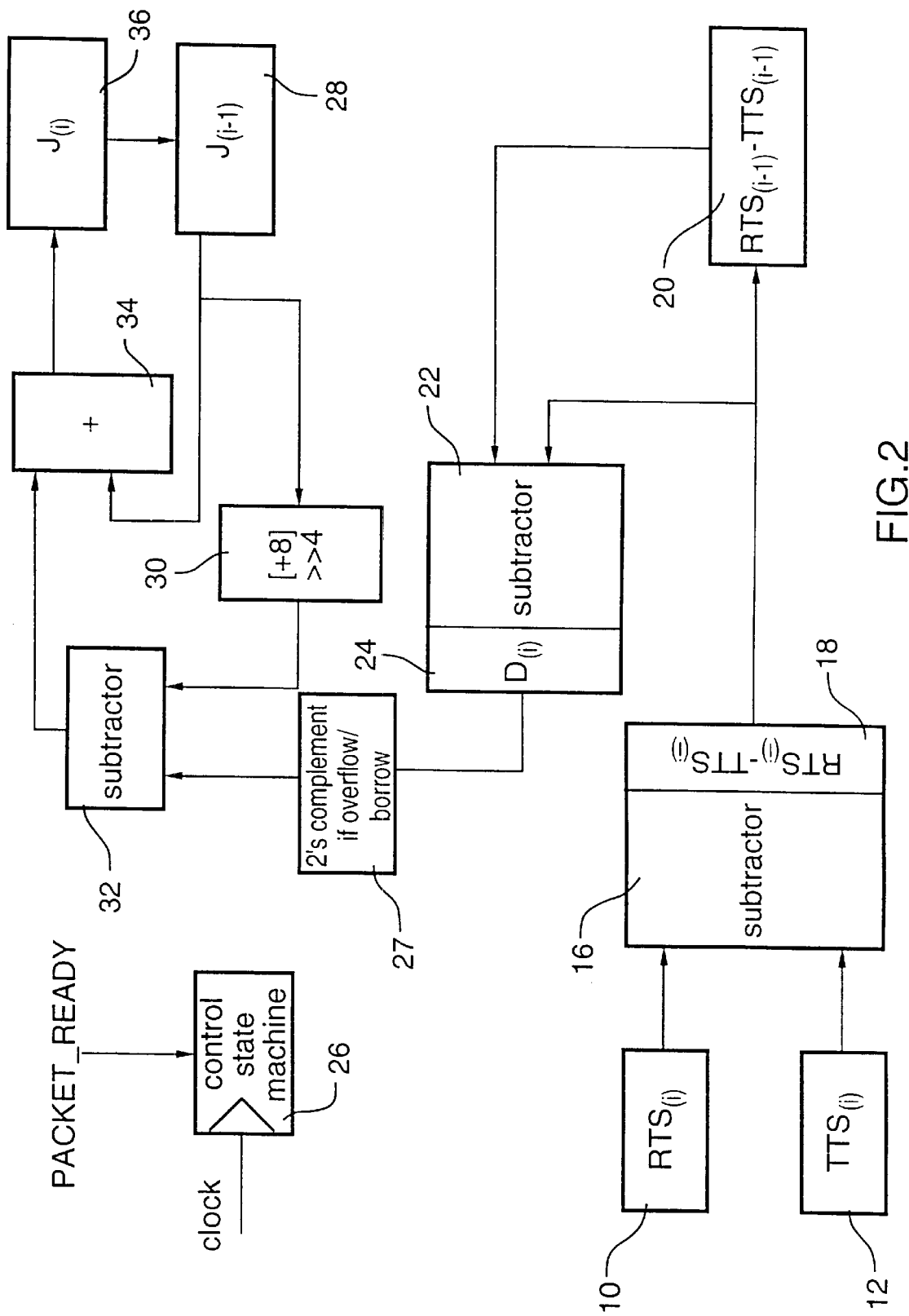
FIG. 2 is a block diagram showing the hardware elements of the jitter calculation system according to the present invention.

Turning to FIG. 2, the basic architecture of the jitter calculation apparatus of the present invention is shown.

Registers 10 and 12 store the transmitter time stamp value ($TTS_{(i)}$) and receiver time stamp value ($RTS_{(i)}$) of a current voice packet. These values are subtracted in a subtractor 16 and the result ($RTS_{(i)}-TTS_{(i)}$) is stored in a register 18. The previous difference value ($RTS_{(i-1)}-TTS_{(i-1)}$) is retrieved from a register 20 and applied to a further subtractor 22 along with the current difference value. The result of the subtractor 22 is the packet spacing difference $D_{(i)}$ which is then stored in a register 24. In order to ensure that $D_{(i)}$ is a magnitude value, any underflow resulting from the subtraction of $RTS_{(i-1)}-TTS_{(i-1)}$ from $RTS_{(i)}-TTS_{(i)}$ is detected and, if present the two's-complement of $D_{(i)}$ is formed. This operation is implemented in state machine 26, as discussed in greater detail below.

The previous jitter value $J_{(i-1)}$ is retrieved from a register 28, incremented by 8 and divided by 16 in a combined adder/shift register 30 and applied to a further subtractor 32. This value is then subtracted from the current spacing value $D_{(i)}$ and the result is added to the previous jitter value $J_{(i-1)}$ in an adder 34, yielding the current estimated interarrival jitter value $J_{(i)}$ which is stored in register 36, and thereafter shifted to register 28 for the next packet calculation.

The registers and hardware elements shown in FIG. 2 are preferably implemented in a memory array capable of holding many sets of values, one for each of several voice streams. When a packet is received, the voice stream to which it belongs is identified and the appropriate set of values in the memory array is accessed.

The operation of the hardware elements of FIG. 2 is controlled by state machine 26. The operation of the state machine is initiated by packet reception logic (which is not shown and which does not form part of the invention) upon receipt of a packet. The packet reception logic asserts a PACKET_READY signal when the RTP header (RTP descriptor, RTP sequence number, RTP time stamp and RTP synchronization source) is received.

The operation of the state machine may be described in verilog code, as follows:

```
    reg [31:0] RTS;
    reg [31:0] TTS;
    reg [31:0] RTSTTSi1;           //RTS(i-1)-TTS(i-1)
    reg [32:0] Di;                 //D(i)
    reg [31:0] RTSTTSi;            /IRTS(i)-TTS(i)
    reg [31:0] Ji1;                //J(i-1)
    reg [31:0] Ji;                 //J(i)
    reg [2:0] state_ctl;
    wire clock, PACKET_READY;
    always @(posedge clock)
    begin
case (state_ctl)
    0:begin
            if (PACKET_READY) state_ctl = 1;
            else state_ctl = 0;
        end
    1: begin
            RTSTTSi = RTS-TTS;
            state_ctl = 2;
        end
    4: begin
            D = {1'b0,RTSTTSi}-{1'b0,RTSTTSi1};
            if(D[32])D = ~D + 1;
            state_ctl = 3;
        end
    3: begin
            RTSTTSi1 = RTSTTSi;
            Ji = Ji1 + D - ((Ji1 + 8) >> 4);
            state_ctl = 4
        end
    4: begin
            Ji1 = Ji;
            state_ctl = 0;
        end
    default: state_ctl = 0
    endcase
end
```

Thus, the apparatus according to the present invention provides for real time jitter estimates for a large number of voice streams using only a single state machine and a set of registers, adders and subtractors, thereby representing a substantial improvement over prior art software implementations.

It will be appreciated that, although a particular embodiment of the invention has been described and illustrated in detail, various changes and modifications may be made. For example, the number of hardware elements and registers used can be reduced to a minimum of four: those for $RTS_{(i)}$, $TTS_{(i)}$, $RTS_{(i-1)}$, $TTS_{(i-1)}$, and $J_{(i-1)}$ in order to increase speed of operation in terms of state machine cycles and reduce cost. All such changes and modifications are believed to be within the sphere and scope of the invention as defined by the claims appended hereto.

What is claimed is:
1. Apparatus for estimating interarrival jitter $J_{(i)}$ between a current voice packet and a previous voice packet both transmitted over an IP network by a transmitter and received at a receiver, according to a formula

$$J_{(i)}=J_{(i-1)}+|D_{(i)}|-((J_{(i-1)}+8)>>4),$$

where $J_{(i-1)}$ represents the interarrival jitter between said previous voice packet and a packet previous to said previous voice packet, and $D_{(i)}$ represents a difference in packet spacing between said current voice packet and said previous voice packet according to a further formula $D_{(i)}=(RTS_{(i)}-TTS_{(i)})-(RTS_{(i-1)}-TTS_{(i-1)})$, where $RTS_{(i)}$ represents a time stamp value at said receiver for said current voice packet, $TTS_{(i)}$ represents a time stamp value at said transmitter for said current voice packet, $RTS_{(i-1)}$ represents a time stamp value at said receiver for said previous voice packet and $TTS_{(i-1)}$ represents a time stamp value at said transmitter for said previous packet, comprising:
  a plurality of memory elements for storing $RTS_{(i)}$, $TTS_{(i)}$, $RTS_{(i-1)}-TTS_{(i-1)}$ and $J_{(i-1)}$;
  first, second and third subtractors;
  an adder;
  a 2's complement circuit;
  a combined adder and shift register; and
  a state machine for
    i) causing said first subtractor to subtract $TTS_{(i)}$ from $RTS_{(i)}$ thereby yielding $RTS_{(i)}-TTS_{(i)}$;
    ii) causing said second subtractor to subtract $RTS_{(i-1)}-TTS_{(i-1)}$ from $RTS_{(i)}-TTS_{(i)}$ thereby yielding $|D_{(i)}|$;
    iii) causing said 2's complement circuit to set a 2's complement value of $D_{(i)}$ in the event of underflow resulting from said second subtractor subtracting $RTS_{(i-1)}-TTS_{(i-1)}$ from $RTS_{(i)}-TTS_{(i)}$ thereby yielding $|D_{(i)}|$;
    iv) causing said combined adder and shift register to add 8 to $J_{(i-1)}$ thereby yielding $J_{(i-1)}+8$ and to shift $J_{(i-1)}+8$ four bits rightward thereby yielding $(J_{(i-1)}+8)>>4$;
    v) causing said third subtractor to subtract $(J_{(i-1)}+8)>>4$ from $D_{(i)}$ thereby yielding $|D_{(i)}|-((J_{(i-1)}+8)>>4)$; and
    vi) causing said adder to add $J_{(i-1)}$ to $|D_{(i)}|-((J_{(i-1)}+8)>>4)$ thereby yielding $J_{(i)}$.
2. The apparatus of claim 1, wherein said plurality of memory elements are configured as a memory array.

* * * * *